(12) United States Patent
Wolf

(10) Patent No.: US 7,958,762 B1
(45) Date of Patent: Jun. 14, 2011

(54) APPARATUS AND METHOD FOR FORMING STRAIGHT TUBES FROM COILED TUBING

(76) Inventor: Clifton E. Wolf, Houston, TX (US)

( * ) Notice: Subject to any disclaimer, the term of this patent is extended or adjusted under 35 U.S.C. 154(b) by 473 days.

(21) Appl. No.: 12/176,365

(22) Filed: Jul. 19, 2008

(51) Int. Cl.
*B21F 11/00* (2006.01)
*B21D 3/12* (2006.01)
*B26D 5/00* (2006.01)

(52) U.S. Cl. ............... 72/129; 72/183; 83/363

(58) Field of Classification Search ......... 72/129, 72/130, 162, 183, 338, 160, 203, 275; 83/363
See application file for complete search history.

(56) References Cited

U.S. PATENT DOCUMENTS

| | | | |
|---|---|---|---|
| 3,800,645 A * | 4/1974 | Alcock et al. | 83/198 |
| 3,933,018 A * | 1/1976 | Fangmeier et al. | 72/7.5 |
| 5,553,668 A * | 9/1996 | Council et al. | 166/77.3 |
| 5,816,127 A * | 10/1998 | Ouchi et al. | 83/318 |

* cited by examiner

*Primary Examiner* — Teresa M Ekiert
(74) *Attorney, Agent, or Firm* — Egbert Law Offices PLLC

(57) ABSTRACT

An apparatus for straightening a coiled tubing has an injector that receives the coiled tubing, a straighter that straightens the coiled tubing from the injector, and a shear that cuts the straightened coiled tubing. The straightener has a frame having a first section rotatably connected to a second section, an actuator connected to the second section, and a straightening wheel connected to the actuator. The injector has a first drive chain and a second drive chain. The first and second drive chains each have semi-circular members forming circular channels that grab an outer surface of the coiled tubing. The shear has a trolley, a clamp, a tubing cutter, a return mechanism, and an automated controller. The automated controller actuates the clamp and the tubing cutter while the trolley translates along rails from a first position to a second position.

8 Claims, 8 Drawing Sheets

APPARATUS AND METHOD FOR FORMING STRAIGHT TUBES FROM COILED TUBING

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to metal pipe used in the oil and gas industry. More particularly, the present invention relates to metal pipe that is bendable, called coiled tubing. More particularly, the present invention relates to apparatus and methods for straightening coiled tubing.

2. Description of Related Art Including Information Disclosed Under 37 CFR 1.97 and 37 CFR 1.98.

Coiled tubing is a term referred to metal piping that is used in the oil and gas drilling industry. Coiled tubing is a metal pipe that usually comes in small sizes, varying from less than one inch to several inches in outer diameter. Because of its small size, coiled tubing is bendable. This is contrast to conventional drilling tubulars which are larger in outer diameter and not flexible. Because it is bendable, coiled tubing is stored on a spool prior to and after its use. A spool can typically hold great lengths of coiled tubing, with some lengths of reaching even over a mile of coiled tubing on one single spool. On advantage of coiled tubing over traditional drilling tubulars is that the entire length stored on a spool is continuous. This is contrast to traditional drilling tubular that come in sixty to ninety foot increments and must be patched end-to-end while drilling.

Coiled tubing has many uses. Coiled tubing can be used to circulate fluid within a wellbore. It may also be used to pump a fluid to a specific location in a well for purposes such as cementing perforations in a wellbore or performing chemical washes of downhole components. Coiled tubing can also be used for drilling a well. A drillbit can be attached to an end of the coiled tubing and the coiled tubing is pushed into the ground so as to drill a wellbore for a well.

As a result of the many uses of coiled tubing, it is used frequently within the oil and gas well drilling industry. One problem associated with the use of coiled tubing in the oil and gas industry is that disposal of used coiled tubing. Normally, used coiled tubing is wound back around a spool. The spool is then taken to a disposal location, the spool is simply left at that location. Thus, after disposal there is normally no further utilization of coiled tubing. Because used coiled tubing is almost never utilized once it is used, it because a worthless scrap metal. Scrap coiled tubing becomes a financial burden on oil and gas drilling companies because not only is the scrap coiled tubing worthless, it is useless and requires additional costs for its disposal.

One such possible use for scrap coiled tubing is in the cattle and ranching industries. Scrap coiled tubing is the perfect size for the tubing need to build continuous fences and cattle guards in the cattle and ranching industries. If there were a way to straighten the scrap coiled tubing, then oil and gas companies would not have to dispose of the scrap coiled tubing, could sell the scrap coiled tubing, and cattle and ranching products could be made from straightened coiled tubing. Thus, there is a need to straighten scrap coiled tubing.

Various patents have been issued relating to the straightening of tubing such as coiled tubing. For example, U.S. Patent Publication No. 2004/0107756, published on Jun. 10, 2004 to Foster, discloses a tubing straightening system having two orthogonally positioned sets of rollers for straightening tubing in a first plane and a second plane. Each set of rollers includes two pairs of opposing and corresponding rollers wherein the position of the two pairs of opposing rollers with respect to the corresponding pair yields tubing passing through the set of rollers in two directions to produce a straightened tube in either of the first or second planes, respectively. The tube straightening system is particularly effective in straightening tubing for downhole torsional applications.

U.S. Pat. No. 4,663,955, issued on May 12, 1987 to Redman, discloses an apparatus for straightening tubing that has a mount for mounting a helically wound coil of tubing for free rotation about the axis of the coil, a first series of tubing straightening roller operable to draw tubing from a helically wound coil of tubing through the first rollers and to approximately straighten the tubing as the tubing is advanced through the first rollers, a severing device for receiving the tubing from the first rollers and cyclically severing a length of approximately straightened tubing from the tubing advanced to the severing device by the first rollers, a conveyer for receiving a length of tubing severed by the severing device and axially advancing the length of tubing, a thrower that receives a length of tubing from the conveyer and throws the tubing axially, a second series of tubing straightening rollers that have an inlet and operable to accurately straighten a severed length of approximately straightened tubing, and a tube guide extending from the throwing means to the inlet of the second rollers for guiding a severed length of tubing thrown by the thrower into the inlet of the second roller.

U.S. Pat. No. 4,724,733, issued on Feb. 16, 1988 to Suarez et al., discloses an apparatus for cutting an elongated workpiece of indefinite length into articles of predetermined length that has drive rollers to feed the workpiece, horizontal and vertical straightener rollers, and a movable carriage assembly which moves in parallel with the workpiece. The free end of the workpiece contacts the carriage assembly and imparts movement to the assembly. The carriage assembly includes a cutter assembly for severing the workpiece, a stripper assembly for breaking the article from the workpiece, and a kick-out for sending the article to a storage bin.

U.S. Pat. No. 3,444,716, issued on May 20, 1968 to Martin, discloses a device for bending, coiling, or straightening tubing that has a rigid grooved roll associated with the second roll at least a periphery of which is formed of yieldable resilient material. Preferably, the yieldable resilient material is a ring received in a peripheral channel formed in a rigid circular support body. The rolls are adjustable towards and away from each other to vary the amount of curvature imparted to or removed from tubing.

U.S. Pat. No. 3,785,587, issued on Jan. 15, 1974 to Meyfarth et al., discloses a coil made of a continuous piece of elongated material, such as tubing, pre-bent into pancake-like spirals called radial layers, each radial layer made up of several concentric and coplanar convolutions, with several radial layers stacked axially. The material is bent prior to coiling at predetermined bending radii which are different for different convolutions within a radial layer. One or more of the convolutions within each radial layer may be bent at a constant bending radius. The rest may be bent at gradually changing radii. The bending radius is controlled by an electric and hydraulic network employing both timed and feedback controls. The coil may be built either upwardly, with the most recently made radial layer always at the bottom of the coil, or it can be built downwardly, with the most recently made radial layer always on the top of the coil.

U.S. Pat. No. 3,828,602, issued on Aug. 13, 1974 to Leithiser, discloses an assemblage for forming and straightening elongated articles in which the primary forming and straightening force is exerted through an elongated articulated member defining a relatively elongated segment engageable with a portion of the elongated article, such segment extending axially of the elongated article engaged thereby and being selectively generative from a linear configuration and through various arcuate configurations from one having an infinite radius to one forming a tangent arc at the apex of engagement thereof with the elongated article.

U.S. Pat. No. 5,553,668, issued on Sep. 10, 1996 to Council et al., discloses a twin carriage coiled tubing injector apparatus for use in inserting coiled tubing into a well, temporarily suspending the coiled tubing, and removing the tubing from the well. The apparatus includes a superstructure with a pair of spaced carriages disposed therein. The carriages each have a gripper chain drive system rotatably mounted thereon and movable therewith. An actuation and linkage system allows the carriage to be moved toward and away from one another in a transverse direction with respect to the superstructure. This movement allows gripper chain systems to be engaged or disengaged from tubing extending through the apparatus. A roller chain system is disposed in each of the carriages and is adapted for engagement and support of the gripper chain systems as the gripper chain systems are engaged with the tubing. A timing gear system may optionally be provided to insure that the rotational speed of the gripper chain systems are substantially constant.

It is an object of the present invention to convert scrap, or used, coiled tubing into straightened pipe.

It is another object of the present invention to straighten coiled tubing for use in the cattle industry.

It is another object of the present invention to straighten coiled tubing for use in the ranching industry.

It is a another object of the present invention to cut straightened coiled tubing in predetermined lengths.

It is another object of the present invention to automate the straightening of coiled tubing.

It is still another object of the present invention to straighten coiled tubing from any angle around the perimeter of the outer surface of the coiled tubing.

It is another object of the present invention to straighten coiled tubing of any diameter.

It is another object of the present invention to enhance the value of scrap coiled tubing.

These and other objects and advantages of the present invention will become apparent from a reading of the attached specification and appended claims.

BRIEF SUMMARY OF THE INVENTION

The present invention is an apparatus for straightening a coiled tubing comprising an injecting means for receiving a coiled tubing, a straightening means downstream of the injecting means for straightening the coiled tubing delivered from the injecting means, and a shearing means downstream of the straightening means for cutting predetermined lengths of said coiled tubing straightened by the straightening means.

The straightening means has a frame having a first section and a second section, an actuator connected to the second section, and a straightening wheel connected to the actuator. The second section of the frame is rotatably connected to the first section. The straightening means also has a first pair of rolling wheels adjacent an end of the frame, and a second pair of rolling wheels adjacent an opposite end of the frame. The straightening wheel has a channel along a perimeter thereof for receiving an outer surface of the coiled tubing. The straightening wheel has an axle that is connected to the actuator. The actuator has a rod connected to the axle of the straightening wheel. The rod causes the channel of the straightening wheel to urge against the outer surface of the coiled tubing so as to straighten the coiled tubing. The first and second sections of the frame have holes formed therein for receiving the coiled tubing. The first section of the frame is fixed to a base.

The injecting means has a first drive chain and a second drive chain. The first drive chain has a plurality of semi-circular members attached to a center thereof. The second drive chain has a plurality of semi-circular members attached to a center thereof. The plurality of semi-circular members of the first drive chain faces the plurality of semi-circular members of the second drive chain so as to form a plurality of circular channels for grabbing an outer surface of the coiled tubing. The plurality of circular channels are aligned with the straightening means. The plurality of circular channels has an inner diameter smaller than an outer diameter of the coiled tubing. The injecting means also has a plurality of alignment wheels connected to an alignment housing. The plurality of alignment wheels are in spaced relation to the first and second drive chains. The plurality of alignment wheels feeds the coiled tubing to the first and second drive chains. The injecting means is driven by a hydraulic fluid.

The shearing means has a trolley translatable along a plurality of rails from a first position to a second position, a clamp mounted to the trolley, a tubing cutter mounted to the trolley, a returning means for returning the trolley from the second position to the first position, and an automated controlling means for actuating the clamp and the tubing cutter so as to cut the predetermined length of the coiled tubing. The trolley has wheels translating along the plurality of rails. The automated controlling means comprises a sensor means for sensing the predetermined length of the coiled tubing, an electronic controller electrically connected to the sensor means, and a first actuating device connected to the electronic controller. The actuating device is also connected to the tubing cutter. The first actuating device opens and closes a hydraulic fluid line so as to cause the tubing cutter to cut the coiled tubing. The automated controlling means also has a second actuating device connected to the electronic controller and to the clamp. The second actuating device opens and closes a hydraulic fluid line so as to cause the clamp to grab an outer surface of the coiled tubing.

The method for straightening coiled tubing includes grabbing coiled tubing from a spool, feeding coiled tubing to an injecting means, delivering coiled tubing from the injecting means to a straightening means, rotating a second section of a frame of the straightening means relative to a first section of the frame of the straightening means, moving an actuator of the straightening means so as to urge a straightening wheel against an outer surface of the coiled tubing, sensing a predetermined length of coiled tubing, clamping the outer surface of the coiled tubing, and cutting the coiled tubing to the predetermined length.

DETAILED DESCRIPTION OF THE INVENTION

Figure 1:
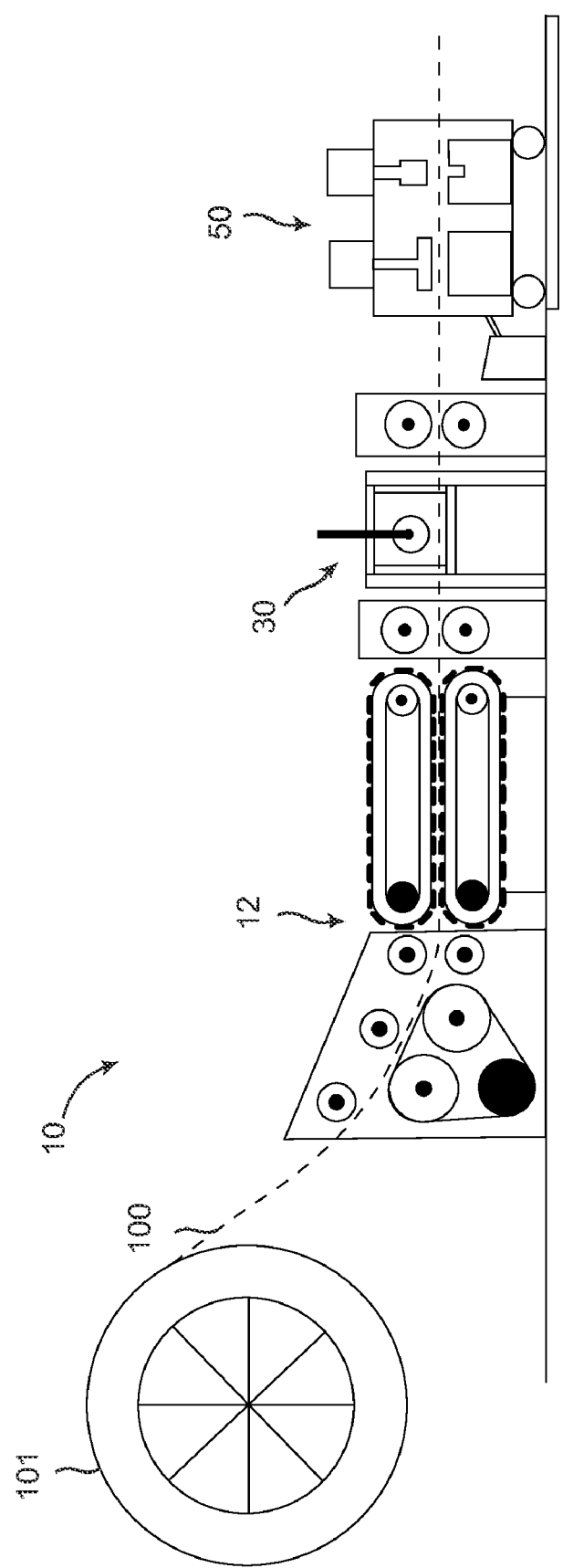
FIG. 1 shows an elevational view of the apparatus of the present invention.

Referring to FIG. 1, there is shown an elevational view of the present invention. A spool 101 holds coiled tubing 100. Coiled tubing 100 is shown in FIG. 1 as a broken line. Coiled tubing 100 is delivered from the spool 101 into the injecting means 12. From the injecting means 12, the coiled tubing 100 is delivered to the straightening means 30. From the straightening means 30, coiled tubing 100 is delivered to the shearing means 50. Thus, coiled tubing 100 passes from the spool 101, into the injecting means 12, through the straightening means 30, and into the shearing means 50 so as to achieve the goal of the present invention, which is to straighten the coiled tubing 100 and cut predetermined lengths thereof.

Figure 2:
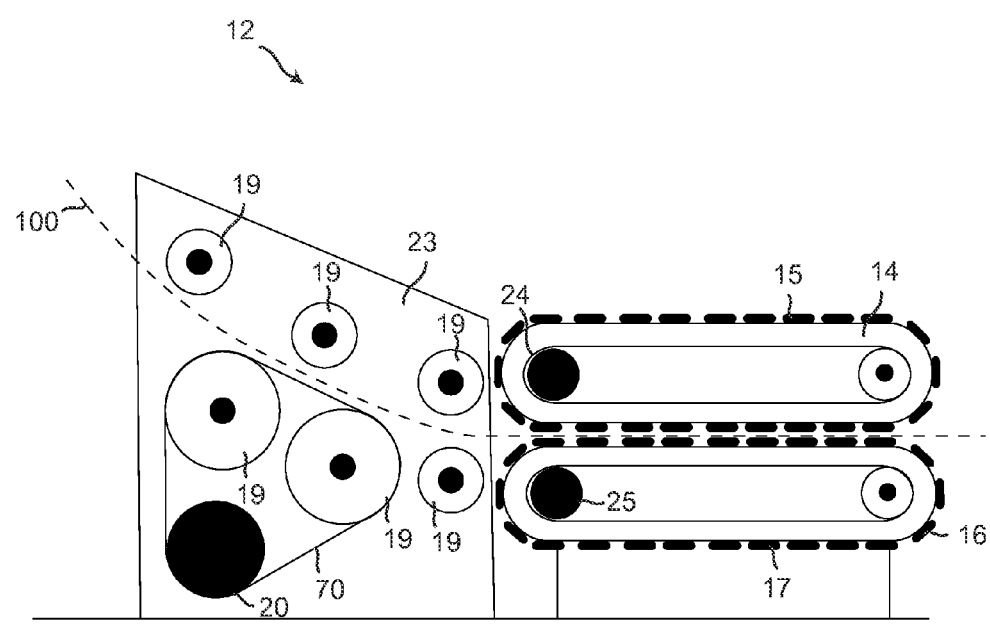
FIG. 2 shows an isolated elevational view of the injecting means of the present invention.

Referring to FIG. 2, there is shown an isolated elevational view of the injecting means 12 of the present invention. A first drive chain 14 is located above a second drive chain 16. The first drive chain 14 has semi-circular members 15 attached to a center thereof. The first drive chain 14 is a closed-chain loop. The first drive chain 14 is driven by a motor 24. The semi-circular members 15 of the first drive chain 14 rotate counter-clockwise so as to grab coiled tubing 100 at the bottom of the first drive chain 14 and pull the coiled tubing 100 from one end of the first drive chain 14 to the other. The second drive chain 16 has semi-circular members 17. The semi-circular members 17 travel clockwise so as to grab coiled tubing 100 at the top of the second drive chain 16. The second drive chain 16 is driven by a motor 25. The semi-circular members 15 of the first drive chain 14 and the semi-circular members 17 of the second drive chain 16 together form a circular channel that grabs the outer surface of the coiled tubing 100. The coiled tubing 100 is grabbed in the space between the first drive chain 14 and the second drive chain 16.

Prior to being grabbed by the first drive chain 14 and the second drive chain 16 of the injecting means 12, the coiled tubing 100 travels into the alignment housing 23 of the injecting means 12. The alignment housing 23 has a number of alignment wheels 19 that align the coiled tubing 100 so as to properly enter between the first drive chain 14 and the second drive chain 16 of the injecting means 12. Two of the alignment wheels 19 are connected by a belt 70 to a motor 20. The motor 20 rotates the alignment wheels 19 that are connected to the motor 20 by belt 70. The other alignment wheels 19 in the alignment housing 23 rotate with the coiled tubing 100 as the coiled tubing 100 passes through the alignment housing 23. The alignment wheels 19 that are not connected to the belt 70 can be adjusted within the alignment housing 23 so as to properly align the coiled tubing 100 with the first drive chain 14 and the second drive chain 16 of the injecting means 12.

Figure 3:
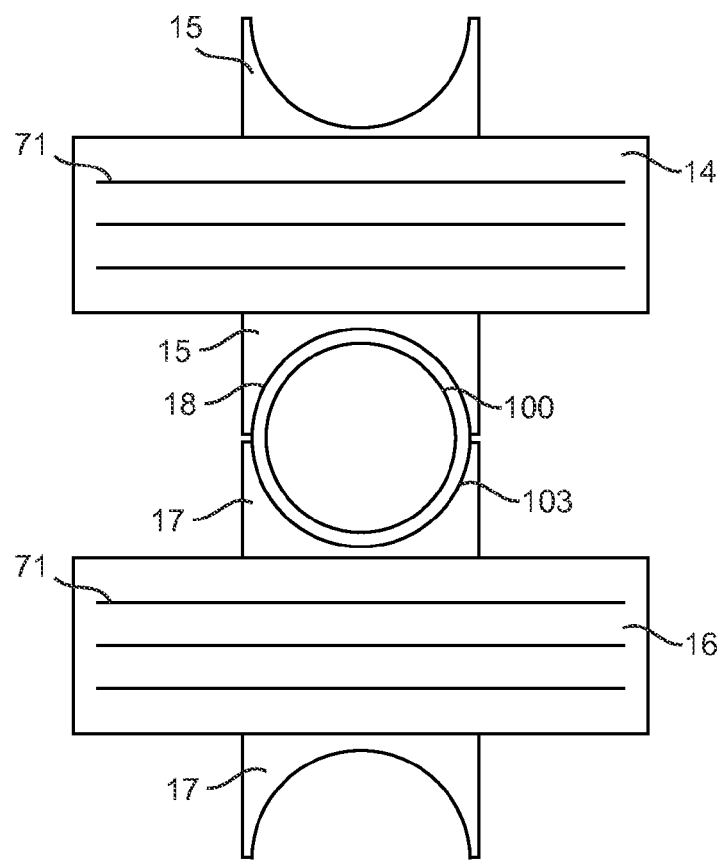
FIG. 3 shows a close-up end view of the drive chains of the present invention.

Referring to FIG. 3, there is shown a close-up end view of the first drive chain 14 having semi-circular members 15 thereon and the second drive chain 16 having a semi-circular members 17 thereon. Each of the first drive chain 14 and second drive chain 16 have links 71 that form a continuous-loop chain for each of the first drive chain 14 and second drive chain 16. The first drive chain 14 and the second drive chain 16 are wider than the semi-circular members 15 and 17, respectively. The semi-circular members 15 of the first drive chain 14 and the semi-circular members 17 of the second drive chain 16 are located in the middle of the first drive chain 14 and the second drive chain 16, respectively. The first drive chain 14 and second drive chain 16 rotate so that the semi-circular members 15 and 17 form a circular channel 18 that is located between the first drive chain 14 and the second drive chain 16. In the space between the first drive chain 14 and the second drive chain 16 where the circular channel 18 is formed, the semi-circular member 15 and semi-circular member 17 are slightly spaced apart. This is because the circular channel 18 formed by the semi-circular members 15 and 17 has slightly smaller diameter than the outer diameter of the coiled tubing 100 that passes between the semi-circular members 15 and 17. Because the diameter of the circular channel 18 is slightly smaller than the coiled tubing 100, the semi-circular members 15 and 17 adequately grab the outer surface 103 of the coiled tubing 100 so as to push it from one end to the other of the first drive chain 14 and second drive chain 16.

As stated above, the semi-circular members 15 and 17 form a circular channel 18 that has a slightly smaller diameter than the outer diameter of the coiled tubing 100. Thus, the semi-circular members 15 and 17 not only grab the coiled tubing 100, they also slightly compress the tubing so as to begin straightening the coiled tubing 100 before it enters the straightening means. The relationship between the diameter of the circular channel 18 and the diameter of the coiled tubing 100 acts as a primer for the straightening means. That is, portions of the scrap coiled tubing 100 passing through the semi-circular members 15 and 17 that have any non-circular cross sections, such as an oval cross-section, are initially compressed by the semi-circular members 15 and 17 so as to make the scrap coiled tubing 100 have more of a circular cross-section.

Figure 4:
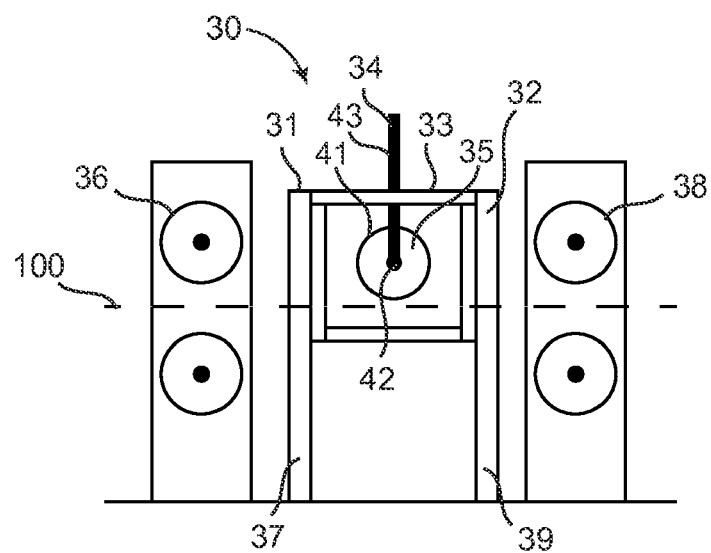
FIG. 4 shows an isolated elevational view of the straightening means of the present invention.

Referring to FIG. 4, there is shown an isolated elevational view of the straightening means 30 of the present invention. The straightening means 30 has a frame 31 and an end 37 and an opposite end 39. The frame 31 also has a first section 32 and a second section 33. The second section 33 rotates relative to the first section 32. The first section 32 is fixed to the base of the apparatus 10. The actuator 34 is attached to the second section 33 of the frame 31. The actuator 34 has a rod 43 that is connected to the axle 42 of the straightening wheel 35. A channel (not shown) is formed along the perimeter 41 of the straightening wheel 35. The rod 43 of the actuator 34 moves up and down so as to move the axle 42 and the straightening wheel 35 up and down. Thus, the rod 43 can push the straightening wheel 35 downward onto the outer surface of the coiled tubing 100. Pressing downward on the outer surface of the coiled tubing 100 allows the straightening wheel 35 to press any upward kinks out of the coiled tubing 100. The straightening wheel 35 rotates on axle 42 as the coiled tubing 100 passes along the perimeter 41 of the straightening wheel 35. A first pair of rolling wheels 36 is located adjacent the end 37 of the frame 31. A second pair of rolling wheels 38 is located adjacent the opposite end 39 of the frame 31. The first pair of rolling wheels 36 and the second pair of rolling wheels 38 act to support the coiled tubing 100 before and after it travels past the straightening wheel 35. The coiled tubing 100 passes between the wheels of the first pair of rolling wheels 36 and between the wheels of the second pair of rolling wheels 38. The wheels of the first pair of rolling wheels 36 and the second pair of rolling wheels rotate as the coiled tubing 100 passes between the first pair of rolling wheels 36 and the second pair of rolling wheels 38. The first pair of rolling wheels 36 can be adjusted so as to press against the outer surface of the coiled tubing 100 passing therebetween. Likewise, the second pair of rolling wheels 38 can be adjusted so as to grasp the outer surface of the coiled tubing 100 traveling therebetween. Thus, the first pair of rolling wheels 36 and the second pair of rolling wheels 38 also act as straightening wheels in the straightening means 30. Similar to the straightening wheel 35, the wheels of the first pair of rolling wheels 36 and second pair of rolling wheels 38 have a channel (not shown) formed along a perimeter thereof.

Figure 5:
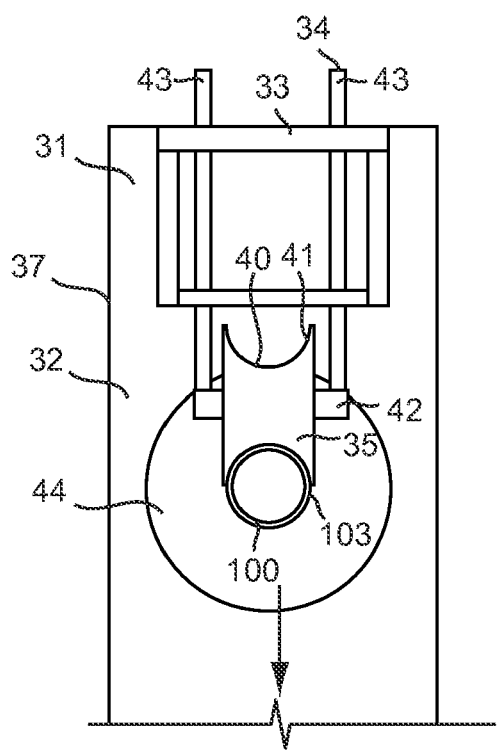
FIG. 5 shows a close-up end view of the straightening wheel and actuator of the straightening means.

Referring to FIG. 5, there is shown a close-up end elevational view of the straightening wheel 35 and actuator 34 of the straightening means 30 of the present invention. The opposite end of the first section 32 of the frame 31 is removed so as to clearly see the straightening wheel 35. The rods 43 of the actuator 34 have positioned the straightening wheel 35 so that channel 40 formed along the perimeter 41 of the straightening wheel 35 abuts the outer surface 103 of the coiled tubing 100. The straightening wheel 35 rotates on axle 42. The rods 43 are secured to the second section 33 of the frame 31. The rods 43 are adjustable up and down so as to increase or decrease the pressure of the channel 40 of the straightening wheel 35 against the outer surface 103 of the coiled tubing 100. The channel 40 of the straightening wheel 35 presses against the outer surface 103 of the top of the coiled tubing 100. Thus, the straightening wheel 35 presses the top of the outer surface 103 of the coiled tubing 100 in a downward direction, as indicated by the arrow in FIG. 5. The coiled tubing 100 travels through the frame 31 and through the hole 44 in the first section 32. The second section 33 can rotate clockwise and counterclockwise at any angle relative to the first section 32 of the frame 31. When rotated, the second section 33 is configured so as to keep the channel 41 of the straightening wheel 35 abutted against the outer surface 33 of the coiled tubing 100.

Figure 6:
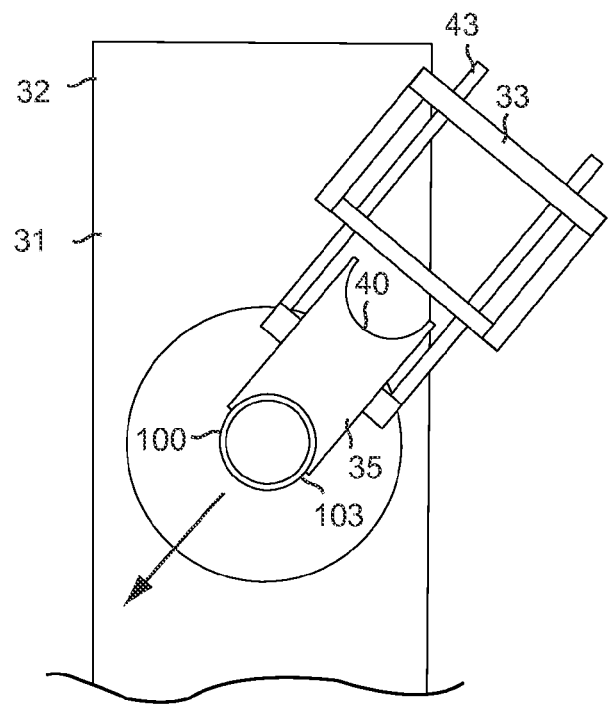
FIG. 6 shows a close-up end view of the actuator and straightening wheel of the straightening means, with the straightening wheel and actuator rotated at an angle relative to the frame.
Figure 7:
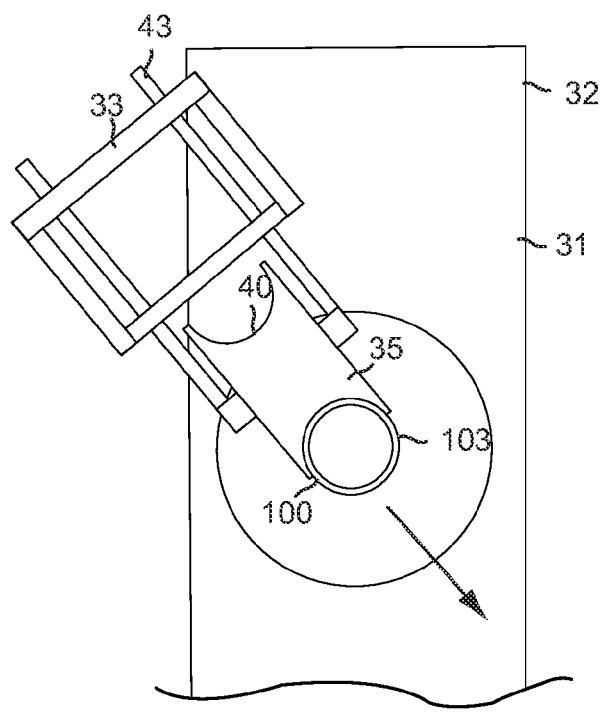
FIG. 7 shows a close-up end view of the straightening wheel and actuator of the straightening means, with the straightening wheel and actuator rotated at another angle relative to the frame.

Contrary to normal expectation, curvature of scrap coiled tubing 100 is largely inconsistent for any given length of coiled tubing 100. Thus, a coiled tubing straightening machine should have a straightening wheel 35 that presses against the outer surface 103 of the coiled tubing 100 at any angle around the outer surface 103 of the coiled tubing 100. FIGS. 6 and 7 show that the present invention is further unique in that the second section 33 of the frame 31 can be rotated relative to the first section 32 of the frame 31 at any angle around the longitudinal axis of the coiled tubing 100. For example, the second section 33 in FIG. 6 has been rotated clockwise relative to the first section 32 of the frame 31. Thus, the channel 40 of the straightening wheel 35 presses against the outer surface 103 of the coiled tubing in the direction indicated by the arrow in FIG. 6. In FIG. 7, the second section 33 of the frame 31 is rotated counter-clockwise relative to the first section 32 of the frame 31. Thus, the channel 40 of the straightening wheel 35 presses against the outer surface 103 of the coiled tubing at an angle indicated by the arrow in FIG. 7.

FIGS. 5 through 7 are representative of only three angles at which the channel 40 of the straightening wheel 35 can exert forces against the outer surface 103 of the coiled tubing 100. It is contemplated by the present invention that the second section 33 of the frame 31 can be rotated at any angle relative to the first section 32 of the frame 31 so that any portion of the outer surface 103 of the coiled tubing 100 can be straightened in any direction. The curvature of coiled tubing 100 varies and is inconsistent along the length of the coiled tubing that is included on the spool. Moreover, the coiled tubing between spools can be largely inconsistent in curvature. Thus, the rotating capability of the second section 33 relative to the first section 32 of the frame 31 is unique and also necessary so as to properly straighten scrap coiled tubing 100.

Figure 8:
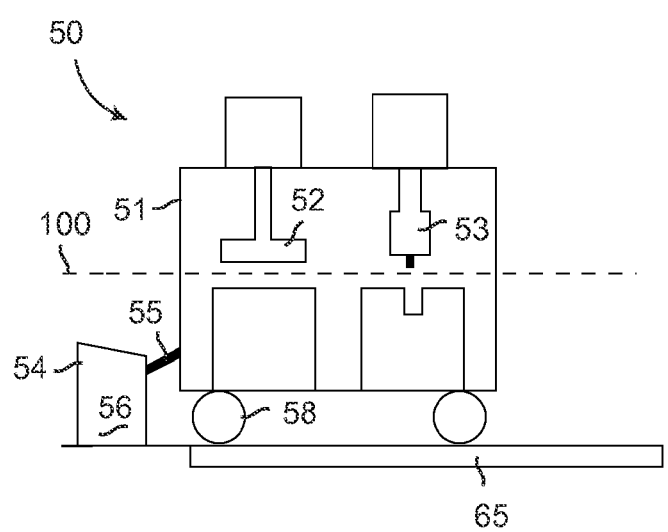
FIG. 8 shows an isolated elevational view of the shearing means of the present invention in the first position.

Referring to FIG. 8, there is shown an isolated elevational view of the shearing means 50 of the present invention in a first position. The shearing means 50 has a trolley 51. The trolley 51 has a clamp 52 and a tubing cutter 53 attached thereto. The trolley 51 is attached to a returning means 54. The returning means 54 has a chain 55 and a spring return 56. The chain 55 connects the trolley 51 with the spring return 56. The trolley 51 has wheels 58 that travel on rails 65. The trolley 51 remains in this first position until a predetermined length of coiled tubing 100 passes thereby. The clamp 52 is then actuated. Once the clamp 52 is actuated, it grabs the outer surface of the coiled tubing 100 and sets the trolley 51 in motion along the rails 65. After the clamp 52 clamps the outer surface of the coiled tubing 100, the tubing cutter 53 cuts a predetermined length of the coiled tubing 100. When the coiled tubing 100 is cut by the tubing cutter 53, the trolley 51 is in a second position on the rail 65.

Figure 9:
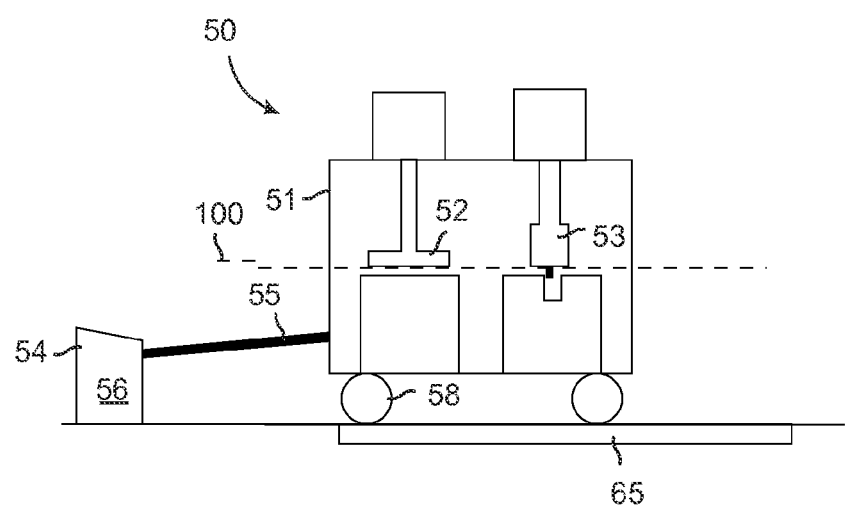
FIG. 9 shows an isolated elevational view of the shearing means of the present invention in the second position.

Referring to FIG. 9, there is shown an isolated elevational view of the shearing means 50 of the present invention in the second position. It should be noted that the trolley 51 is at the end of the rail 65. The clamp 52 is clamped against the outer surface of the coiled tubing 100, and the tubing cutter 53 has cut a predetermined length of coiled tubing 100. The chain 55 of the returning means is extended between the trolley 51 and the spring return 56. Once the coiled tubing is cut by the tubing cutter 53, the tubing cutter 53 moves upward away from the coiled tubing 100 and the clamp 52 releases its grasp on the outer surface of the coiled tubing 100. The spring return 56 of the returning means 54 then pulls the chain 55 and the trolley 51 back to the first position on the rail 65. This is first position that is shown in FIG. 8.

Figure 10:
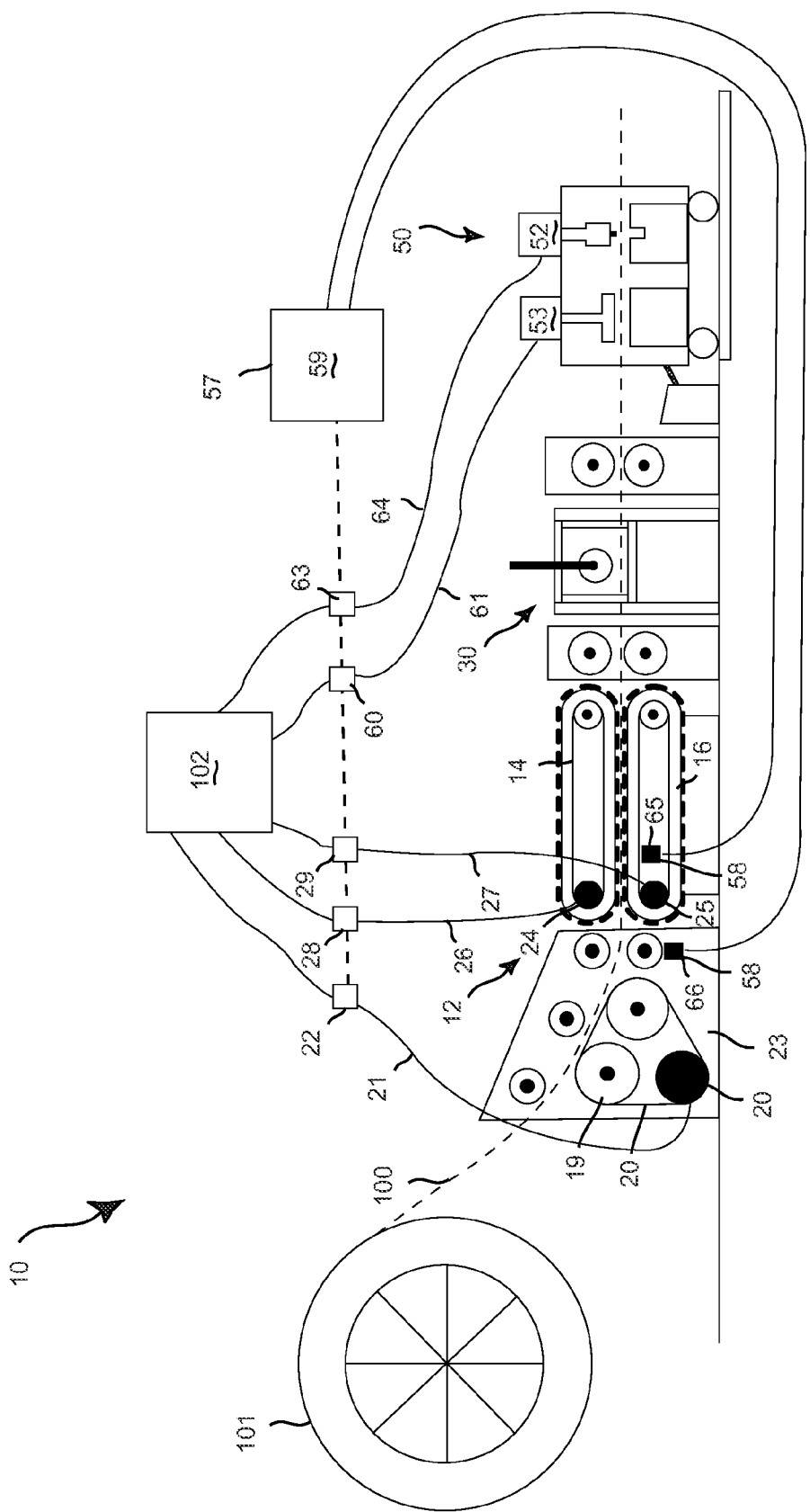
FIG. 10 shows an elevational view of the apparatus of the present invention, with the automated controlling means and hydraulic fluid pump.

Referring to FIG. 10, there is shown the apparatus 10 of the present invention with a hydraulic fluid pump 102 and the automated controlling means 57. Pressurized hydraulic fluid is supplied by the hydraulic fluid pump 102 to the hydraulic motor 20 for the alignment wheels to hydraulic fluid line 21. Actuating device 22 controls the hydraulic fluid that travels between the hydraulic fluid pump 102 and the motor 20. The motor 20, in turn, turns the alignment wheels 19 connected to the motor 20 by belt 70. The hydraulic fluid pump 102 is also connected to motor 24 by hydraulic fluid line 26. The flow of hydraulic fluid in line 26 is controlled by actuating device 28.

Pressurized hydraulic fluid in line 26 turns motor 24 so as to turn the first drive chain 14. The hydraulic fluid pump 102 is connected to motor 25 by hydraulic fluid line 27. The flow of hydraulic fluid in line 27 is controlled by actuating device 29. Pressurized hydraulic fluid turns motor 25 so as to turn the second drive chain 16. Hydraulic fluid pump 102 is also connected to the clamp 52 of the shearing means 50 by line 61. The flow of hydraulic fluid between the hydraulic fluid pump 102 and the clamp 52 is controlled by actuating device 60. When line 61 is pressurized by hydraulic fluid upon actuation of actuation device 60, the clamp 52 grabs the outer surface of the coiled tubing 100 so as to begin the cutting of the coiled tubing 100 with the tubing cutter 53, as described above. Hydraulic fluid pump 102 is connected to the tubing cutter 53 by line 64. The flow of hydraulic fluid in line 64 is controlled by actuation device 63. After line 61 has been pressurized with hydraulic fluid so as to clamp the outer surface of the coiled tubing 100 with clamp 52, line 64 is pressurized with hydraulic fluid so that the tubing cutter 53 cuts a predetermined length of coiled tubing 100.

The sensor means 58 has a first sensor 65 and a second sensor 66. The first sensor 65 is mounted on the second drive chain 16. The second sensor 66 is mounted on the alignment housing 23. The first sensor 65 and second sensor 66 of the sensor means 58 are configured so as to sense the length of coiled tubing 100 passing thereby. Once a predetermined length of coiled tubing 100 passes by the sensor means 58, the sensor means 58 sends a signal to the electronic controller 59 of the automated controlling means 57. The electric controller 59 then actuates the actuation devices 22, 28, 29, 60 and 63 so as to operate the apparatus 10 of the present invention.

Because of the continuous nature of the apparatus 10 of the present invention, it is important that the coiled tubing 100 continuously move therethrough. Thus, the trolley design of the shearing means 50 is important and unique because if the trolley 51 were simply stationary, then the apparatus 10 would have to be started and stopped each time at predetermined length of coiled tubing 100 were cut. This starting and stopping would inevitably be detrimental to the straightening of coiled tubing 100.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus for straightening a coiled tubing comprising:
    an injecting means for receiving the coiled tubing, said injecting means being driven by a hydraulic fluid, said injecting means comprising:
        a first drive chain having a plurality of semi-circular members attached to a center thereof;
        a second drive chain having a plurality of semi-circular member attached to a center thereof, said plurality of semi-circular members of said first drive chain facing said plurality of semi-circular members of said second drive chain so as to form a plurality of circular channels for grabbing an outer surface of the coiled tubing, said plurality of circular channels having an inner diameter smaller than an outer diameter of the coiled tubing; and
        a plurality of alignment wheels connected to an alignment housing, said plurality of alignment wheels being in spaced relation to said first and second drive chains;
    a straightening means downstream of said injecting means for straightening the coiled tubing delivered from said injecting means; and
    a shearing means downstream of said straightening means for cutting predetermined lengths of the coiled tubing straightened by said straightening means.

2. The apparatus of claim 1, said plurality of alignment wheels suitable for feeding the coiled tubing to said first and second drive chains.

3. The apparatus of claim 1, said plurality of circular channels being aligned with said straightening means.

4. An apparatus for straightening a coiled tubing comprising:
    an injecting means for receiving the coiled tubing;
    a straightening means for straightening the coiled tubing delivered from said injecting means; and
    a shearing means for cutting a predetermined length of the coiled tubing straightened by said straightening means, said shearing means comprising:
        a trolley translatable along a plurality of rails from a first position to a second position;
        a clamp mounted to said trolley;
        a tubing cutter mounted to said trolley;
        a returning means for returning said trolley from said second position to said first position; and
        an automated controlling means for actuating said clamp and said tubing cutter so as to cut said predetermined length of the coiled tubing, said automated controlling means comprising:
            a sensor means for sensing said predetermined length of said coiled tubing;
            an electronic controller electrically connected to said sensor means; and
            a first actuating device connected to said electronic controller, said actuating device connected to said tubing cutter.

5. The apparatus of claim 4, said trolley having wheels translating along said plurality of rails.

6. The apparatus of claim 4, said first actuating device opening and closing a hydraulic fluid line so as to cause said tubing cutter to cut said coiled tubing.

7. The apparatus of claim 4, said automated controlling means further comprising:
    a second actuating device connected to said electronic controller, said second actuating device connected to said clamp.

8. The apparatus of claim 7, said second actuating device opening and closing a hydraulic fluid line so as to cause said clamp to grab an outer surface of the coiled tubing.

* * * * *